United States Patent [19]

Hambrecht et al.

[11] 4,424,304

[45] Jan. 3, 1984

[54] THERMOPLASTIC MOLDING MATERIALS

[75] Inventors: Juergen Hambrecht, Heidelberg; Franz Brandstetter, Neustadt; Adolf Echte, Ludwigshafen; Karl Gerberding, Wachenheim; Walter Heckmann, Weinheim, all of Fed. Rep. of Germany

[73] Assignee: BASF Aktiengesellschaft, Ludwigshafen, Fed. Rep. of Germany

[21] Appl. No.: 383,142

[22] Filed: May 28, 1982

[30] Foreign Application Priority Data

Jun. 15, 1981 [DE] Fed. Rep. of Germany ....... 3123716

[51] Int. Cl.³ .............................................. C08L 61/04
[52] U.S. Cl. ....................................... 525/68; 525/905

[58] Field of Search .................................. 525/68, 905

[56] References Cited

U.S. PATENT DOCUMENTS

| | | | |
|---|---|---|---|
| 4,101,503 | 7/1978 | Cooper et al. | 525/68 |
| 4,101,504 | 7/1978 | Cooper et al. | 525/68 |
| 4,101,505 | 7/1978 | Cooper et al. | 525/68 |

*Primary Examiner*—J. Ziegler
*Attorney, Agent, or Firm*—Norbert M. Lisicki

[57] ABSTRACT

Thermoplastic molding materials based on styrene polymers modified to be impact resistant with EPDM rubbers and polyphenylene ethers wherein the particles of the flexible components of the impact resistant styrene polymer have an average particle diameter range of 0.3 to 0.7 microns.

1 Claim, No Drawings

THERMOPLASTIC MOLDING MATERIALS

BACKGROUND OF THE INVENTION

1. Field of the Invention

The invention relates to thermoplastic molding materials based on styrene polymers and polyphenylene ethers modified to be impact resistant with EPDM rubbers.

2. Prior Art

Thermoplastic materials suitable for the preparation of molded parts and containing impact resistant styrene polymers and polyphenylene ethers are known, for example, from U.S. Pat. Nos. 3,383,435, 4,128,602 as well as 4,128,603. Such molding materials are suited for the preparation of molded parts which excel by their better dimensional stability when exposed to heat compared with impact resistant styrene polymers which are not mixed with polyphenylene ethers. While the physical properties of such molding materials are generally satisfactory, it has been found that molded parts produced from such molding materials are more or less susceptible to weathering.

In U.S. Pat. Nos. 3,943,191, 4,101,503, 4,101,504 and 4,101,505, mixtures of polyphenylene ether and styrene polymers modified to be impact resistant with EPDM rubbers and improved with resistance to weathering are described. It has been found, however, that the mechanical properties of these products do not quite reach the level of the polybutadiene modified impact resistant polystyrenes and that, furthermore, the surface gloss of molded parts produced from these materials is unsatisfactory.

SUMMARY OF THE INVENTION

The object of this invention was to develop thermoplastic molding materials based on styrene polymers and polyphenylene ethers modified to be impact resistant with EPDM rubbers which result in molded parts with improved surfaces and good mechanical properties.

According to this invention, this task is met by molding materials in which particles of the flexible component of the styrene polymer modified to be impact resistant with EPDM rubber have an average particle diameter of 0.3 to 0.7 microns.

DESCRIPTION OF THE PREFERRED EMBODIMENTS

Molding materials are understood to be unformed mixtures which can be processed into molded parts or semifinished goods by thermoplastic processing within certain temperature ranges. The molding materials may be present in the form of granules, but they may also be in form of powder or may be preformed by pelletizing or may be present in the form of panels and foils.

The impact resistant styrene polymers contained in the molding materials can be produced according to any desired process if care is taken that the particle size according to this invention is achieved. The measures employed for this purpose are well known. They are described, for example, in the publication by A. Echte in Zeitschrift Angewandte Makromolekulare Chemie [*Journal for Applied Macromolecular Chemistry*], vol. 58/59 (1977) on pages 175 through 198.

The thermoplastic molding materials may contain impact resistant styrene polymers and polyphenylene ethers in desired amounts, for example, in amounts of 5 to 90 percent by weight of styrene polymer and 95 to 10 percent by weight of polyphenylene ethers. Particularly well suited for the manufacture of molded parts are molding materials which contain 20 to 80 percent by weight of impact resistant styrene polymers and 80 to 20 percent by weight of polyphenylene ether.

The most frequently used processes for the preparation of impact resistant styrene polymers are polymerization in bulk or solution as described, for example, in U.S. Pat. No. 2,694,692, French Pat. No. 1,561,586 and processes for the bulk suspension polymerization as described in U.S. Pat. No. 2,862,906, German Published Application No. 2,400,495, and German Published Application No. 2,534,781. Of course, other methods are also applicable if the above-referenced particle size and morphology is achieved.

Suited monovinyl aromatic compounds include particularly styrene, also the nucleous or side chain alkylated styrenes. Preferably, however, styrene is used alone.

So-called EPDM rubbers as they are described, for example, by Ritchie in the publication "Vinyl and Allied Polymers," vol. 1, page 121 (1968), are used as rubbers in order to render the styrene polymers impact resistant. By referring to this publication, its disclosure content is fully incorporated in this application. EPDM rubbers are thus understood to be ethylene-propylene terpolymers which contain dienes as the tercomponent. Such EPDM rubbers may contain, for example, 30 to 60 percent by weight of ethylene, up to 65 percent by weight of propylene and 1 to 15 percent by weight of diene in polymerized form with the weight percentages adding up to 100. The preferred rubber-like EPDM interpolymers are composed of ethylene, propylene and 5-ethylidene-2-norbornes; ethylene, propylene and 1,4-hexadiene; and ethylene propylene, and dicyclopentadiene. The EPDM rubbers appropriately have a Mooney viscosity number ($M_L 1+4$ 100 C), in a range of 35 to 100.

The impact resistant polymers with the desired properties according to this invention are prepared by polymerization of the monovinyl aromatic compounds in the presence of the EPDM rubber. Thus the polymerization generally takes place according to known methods in bulk, solution or aqueous dispersion with the rubber initially being dissolved in the polymerizable monomer and this starting solution then being polymerized.

Up to a maximum of 50 percent by weight based on the applied monovinyl aromatic compounds of an inert diluting agent may be added to this starting solution if solution polymerization is employed. Suitable inert diluting agents include, for example, aromatic hydrocarbons or mixtures of aromatic hydrocarbons. Toluene, ethylbenzene, the xylylenes or mixtures of these compounds are preferred.

If the polymerization is carried out in an aqueous dispersion, solvents are not generally added. It is particularly advantageous to prepolymerize the rubber solution and the monomers in bulk and under the effect of shear forces until a conversion of approximately 45 percent is achieved which is necessary for obtaining the particle sizes according to this invention. This reaction mass is then suspended in water and subsequently completely polymerized. Generally this process is triggered by adding oil soluble initiators such as benzoyl peroxide, dicumyl peroxide, di-tertiary-butyl peroxide, azodiisobutyronitrile, etc., or combinations of these materials which decompose into radicals. However, the preliminary polymerization may also be started thermally. Well known suspension agents are water soluble, high molecular weight compounds such as methylcellulose, oxypropylcellulose, polyvinyl alcohol, partially saponified polyvinyl acetates, etc., or inorganic dispersants such as barium sulfate. The suspension agents are generally used in amounts of 0.1 to 5 percent by weight based on the organic phase.

For the polymerization in bulk or in solution, a temperature range between 50° C. and 250° C., preferably 100° C. to 200° C., is generally employed. During the first part of the polymerization, the mixture must be well agitated, that is, until at least 45 percent of the monovinyl aromatic compound has been reacted. All of these polymerization processes are well known and are described in detail in the literature. A summarizing description can be found under Amos, *Polymer Engineering Science*, vol. 14 (1974), 1, page 1 through 11, as well as in U.S. Pat. Nos. 2,694,692 and 2,862,906 in which further details may be obtained.

The flexible component generally has a heterogeneous structure. As a rule, it forms during the manufacturing process and the resultant quantity and degree of separation are influenced by the process conditions. It is a generally known fact that the solution of the EPDM rubber to be polymerized in the monovinyl aromatic monomer separates into two phases immediately after the reaction begins. One of these phases, a solution of the rubber in the monomeric vinyl aromatics initially forms the coherent phase whereas the second solution of the polyvinyl aromatic and its own monomer remain suspended in it in droplets. With increasing conversion, the amount of the second phase increases at the cost of the first and by the consumption of the monomers. This results in a change in the phase coherency. As this change takes place, drops of EPDM rubber solution form in the polyvinyl aromatic solution. However, these drops, in turn, include smaller drops of the phase which is now the external phase. In addition to this process, a grafting reaction takes place during which chemical bonds are formed between the EPDM rubber molecules and the polyvinyl aromatics resulting in the formation of graft copolymers of the two components. This process is known and is described in detail, for example, by Fischer, *Applied Macromolecular Chemistry*, vol. 33 (1973 pages 35 through 74.

The grafted as well as the mechanically enclosed portion of the polyvinyl aromatics in the rubber particles is to be considered part of the flexible component.

When the mass is thoroughly polymerized, a heterogeneous flexible component has been produced resulting in grafted rubber particles with inclusions of matrix material (polyvinyl aromatic) which is incorporated in a rigid matrix of the polyvinyl aromatics. The greater the amount of the enclosed matrix material, the greater is the amount of flexible component with constant EPDM rubber content.

Thus the amount of flexible component is not only a function of the applied EPDM rubber but also of the process control, particularly prior to and during the phase inversion. The particular modes are a result of specific processes and the expert is familiar with them. (See, for example, Freeguard, *British Polymer Journal*, vol. 6 (1974) pages 203 through 228; Wagner, Robeson, Rubber Chem. Techn. 43 (1970), page 1129 and the following.)

The amount of EPDM rubber which is dissolved in the monomer prior to polymerization thus producing the starting solution is appropriately chosen as a function of the vinyl conversion during the polymerization in such a manner that the flexible component content in the resultant polymer of the monovinyl aromatic compounds modified to be impact resistant is at least 15 percent by weight, preferably 20 percent by weight and more, based on the impact resistant polymer. The requirement that the polyvinyl aromatic must form the coherent phase establishes the upper limit of the flexible component at approximately 50 to 60 percent by weight. A flexible component content of 25 to 35 percent by weight based on the impact resistant polymer has proven to be particularly advantageous for the thermoplastic molding materials according to this invention. The EPDM rubber component of the impact resistant polymer will then generally vary between 4 and 25 percent by weight, preferably 5 to 20 percent by weight.

As explained, and as is sufficiently well known, the impact resistant polymers of the monovinyl aromatic compounds consist of a uniformly enveloping phase (matrix) of the polymer of the monovinyl aromatic compound in which the EPDM rubber particles of the flexible component are embedded as the disperse phase with the rubber particles being partially cross-linked and having been more or less grafted to the monovinyl aromatic compounds during the polymerization.

The average particle size of the disperse flexible component was determined by counting and averaging thin layer electron microscopies of the impact resistant polymers, (compare F. Lenz, *Journal for Scientific Microscopie*, vol. 63 (1956), pages 50–56). The particle size of the disperse flexible component phase is adjusted in a basically well known manner during the polymerization of the monovinyl aromatic compound, namely, by adjusting the agitator speed during the first part of the polymerization, that is, up to a conversion of the monomers of equal about 45 percent. The greater the particle size of the disperse flexible component phase is, the lower the agitator speed and thus the lower are the shear stresses. The relationship between the agitator speed and the size and distribution of the rubber particles in the resulting impact resistant polymer is described, for example, in the cited work by Freeguard to which we refer for additional details. The respective required agitator speed for achieving the desired particle size of the disperse flexible component phase is, among other things, a function of the respective equipment conditions and is known to the expert or can be determined by a few simple tests.

The average particle size (weight average) of the disperse flexible component phase was determined by counting and averaging the particles being part of the same class size (constant interval width) using thin layer electron microscopy. The cumulative distribution curve is determined by way of the volumes of the particles (third power of the apparent diameter) within the intervals. With a 50 percent ordinate value, the equivalent value can then be taken from the abscissa. The listed average diameters represent an average value of at least 5000 particles. The average particle size must be located in the range of 0.3 to 0.7 microns, preferably in the range of 0.35 to 0.6 microns.

The polyethers are compounds based on polyphenylene oxides disubstituted in the ortho position with the ether oxygen of the one unit being bonded to the benzene nucleous of the adjacent unit. At least 50 units should be bonded to each other. In the ortho position to the oxygen, the polyethers may have hydrogen substituents, halogenated hydrocarbons which do not have a tertiary hydrogen atom in the α-position, phenyl radicals and oxo-hydrocarbon radicals. Examples of such substances include the following: poly(2,6-dichloro-1,4-phenylene)-ether, poly(2,6-diphenyl-1,4-phenylene)-ether, poly(2,6-dimethoxy-1,4-phenylene)-ether, poly(2,6-dimethyl-1,4-phenylene)-ether, poly(2,6-dibromo-1,4-phenylene)-ether. Preferably used is poly(2,6-dimethyl-1,4-phenylene)-ether. Particularly preferred are poly(2,6-dimethyl-1,4-phenylene)-ether with a limiting viscosity between 0.45 and 0.65 dl/g (measured in chloroform at 30° C.).

The mixtures of the styrene polymers modified to be impact resistant with EPDM rubbers and polyphenylene ethers may also contain further additives such as pigments, dyes, fillers, flame retardants, other compatible polymers, antistatics, antioxidants and lubricants.

The thermoplastic molding materials according to this invention are prepared according to normally applied methods using equipment permitting homogeneous mixing such as kneaders, extruders or roller mixers. In addition to excellent tenacity and good surface appearance, the molded parts of the molding materials according to this invention primarily excel by their good surface gloss.

The following examples are employed to exemplify the invention. All parts are by weight unless otherwise specified.

EXAMPLES AND COMPARISON EXAMPLES

Examples 1 and 2

An impact resistant polystyrene based on an EPDM rubber was prepared in accordance with the following formula:

A solution consisting of 1620 grams styrene, 144 grams EPDM rubber with the following characteristics: propylene component, 46 percent, diene component: ethylidene norborne 7 percent, dicyclopentadiene 2 percent, Mooney viscosity ($M_L 1+4$ 100 C.): 50 and 36 grams of ditertiary-butyl peroxide was prepolymerized in a 5 liter mixing vessel with an anchor agitator at a temperature of 120° C. and an agitator speed of 600 rpm until a solids content of 32.5 percent by weight was achieved.

Subsequently, 1800 grams of water containing 9.0 grams polyvinyl pyrrolidone having a K-value of 90 and 1.8 grams $N_4P_2O_7$ were added and the agitator speed was reduced to 400 rpm. After polymerization at 130° C. for 3 hours and at 250° C. for 7 hours, the reaction mixture was polymerized to a styrene conversion of 99 percent weight.

The average particle size of the flexible component with cell particle morphology was 0.4 microns and the flexible component had the following size distribution
< 0.1 microns:2 percent
0.1–0.3 microns:10 percent
0.3–0.5 microns:68 percent
0.5–0.7 microns:17 percent
> 0.7 microns:3 percent In each case, 75 percent by weight of polyphenylene ether (Example 1) and/or 55 percent by weight of impact resistant polystyrene were mixed with 45 percent by weight polyphenylene ether (Example 2). The results are listed in the table.

Comparison Tests A and B

In accordance with Example 1 of German Published Application No. 2,824,389, an impact resistant polystyrene was prepared with a rubber content of 8 percent by weight and an average particle size of 1.2 microns and a size distribution of
< 0.5 micron:5 percent
0.5–1.0 micron:39 percent
1.0–1.5 microns:31 percent
1.5–2.0 microns:15 percent
> 2.0 microns:10 percent In each case 75 percent by weight of the impact resistant polystyrene were mixed with 25 percent by weight of polyphenylene ether (Example A) and 55 percent by weight of impact resistant polystyrene were mixed with 45 percent by weight of polyphenylene ether (Example B).

C.

In accordance with the above-described preparation of the polystyrenes modified to be impact resistant with EPDM according to this invention and having an average particle size of 0.4 microns, a test was carried out for which an agitator speed of 150 rpm was employed during the prepolymerization. This resulted in a polymer having an average particle size of 3.5 microns and a size distribution of the rubber particles of
< 1.0 micron:1 percent
1.0–2.0 microns:8 percent
2.0–3.0 microns:20 percent
3.0–4.0 microns:43 percent
4.0–5.0 microns:19 percent
5.0–6.0 microns: 7 percent
> 6.0 microns: 2 percent Seventy-five percent by weight of the resultant impact resistant polystyrene were mixed with 25 percent by weight of polyphenylene ether.

Examples 1 and 2; Comparison Tests A through C

In a double screw extruder, the listed parts by weight of impact resistant polystyrene with the listed parts by weight of poly(2,6-dimethyl-1,4-phenylene)-ether with $[\ ]=0.61[dl/g]$ (measured in chloroform at 30° C.) as well as 2.0 parts by weight of a polythylene wax with a melting viscosity of 1350 centistokes and 1.6 parts by weight of tris(nonylphenyl)-phosphite were melted at 300° C., were homogenized and subsequently granulated.

With the aid of the above-mentioned concentrates and impact resistant polystyrene using a double screw extruder at 270° C., adding polyethylene and tris(nonylphenyl)-phosphite, mixtures were produced which based on 100 parts by weight of the mixture contained the parts by weight of poly(2,6-dimethyl-1,4-phenylene)-ether listed in the table, 1.5 parts by weight of polyethylene and 0.8 parts by weight of tris(nonylphenyl)-phosphite.

Using a spray injection device, test pieces were produced from these mixtures at 280° C. Using these test pieces with dimensions of 50×40×2 mm, the gloss was determined by reflection measurements using a Lange fotometer. In each case, the angle of incidence and angle of reflection was 60° C. A white fleece paper (=0 percent) and a black glass mirror (=100 percent) was used as the standard.

The notch impact resistance (kJ/m$^2$) was measured in accordance with DIN 53 453 using standard small rods injection molded at 280° C.

The Vicat softening point in °C. was determined in accordance with DIN 53 460, method B, in silicon oil. T,0180

The embodiments of the invention in which an exclusive privilege or property is claimed are defined as follows:

1. An impact resistant thermoplastic molding material comprising a mixture of impact resistant styrene polymer and polyphenylene ether wherein the styrene polymer is prepared by the polymerization of styrene monomer in the presence of a terpolymer selected from the group consisting of ethylene, propylene and 5-ethylidene-2-norbone; ethylene, propylene and 1,4-hexadiene, and ethylene, propylene and dicyclopentadiene, and wherein said styrene polymer consists of a flexible component of matrix grafted rubber particles with inclusions of polystyrene incorporated in a rigid matrix of polystyrene, said flexible component having an average particle diameter of 0.3 to 0.7 microns.

* * * * *